(12) United States Patent
Voeller et al.

(10) Patent No.: US 11,333,525 B2
(45) Date of Patent: May 17, 2022

(54) SYSTEM FOR CALIBRATION AND INSPECTION OF RANGE FINDING SENSORS ON A VEHICLE

(71) Applicant: Hunter Engineering Company, St. Louis, MO (US)

(72) Inventors: David A. Voeller, St. Louis, MO (US); Gerald E. Friton, Chesterfield, MO (US); Timothy A. Strege, Sunset Hills, MO (US); Patrick Callanan, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 443 days.

(21) Appl. No.: 16/572,240

(22) Filed: Sep. 16, 2019

(65) Prior Publication Data

US 2020/0011703 A1     Jan. 9, 2020

Related U.S. Application Data

(63) Continuation of application No. 15/125,921, filed as application No. PCT/US2015/022797 on Mar. 26, 2015, now Pat. No. 10,458,811.

(Continued)

(51) Int. Cl.
*G01C 25/00* (2006.01)
*G01B 11/27* (2006.01)
(Continued)

(52) U.S. Cl.
CPC ............ *G01C 25/00* (2013.01); *G01B 11/272* (2013.01); *G01C 3/02* (2013.01); *G01S 7/4026* (2013.01); *G01S 7/4052* (2013.01); *G01S 7/4972* (2013.01); *G01S 13/931* (2013.01); *G01S 17/931* (2020.01); *G05D 1/0088* (2013.01); *G01S 7/4086* (2021.05)

(58) Field of Classification Search
None
See application file for complete search history.

(56) References Cited

U.S. PATENT DOCUMENTS 5,977,906 A * 11/1999 Ameen ................. G01S 7/4026
                                                  342/174
6,636,172 B1 * 10/2003 Prestl .................... G01S 7/4026
                                                  342/173

(Continued)

OTHER PUBLICATIONS

International Search Report corresponding to PCT/US2015/022797 dated Jun. 26, 2015.

(Continued)

*Primary Examiner* — James R Hulka
(74) *Attorney, Agent, or Firm* — Sandberg Phoenix & von Gontard P.C.

(57) ABSTRACT

An apparatus and method for aligning, calibrating, or inspecting an onboard vehicle sensor having an external field of view by providing a calibration component on a support structure for positioning at a short calibration distance from the vehicle and which is within the field of view of said sensor. The calibration component is configured to appear to the sensor as if it was positioned at a predetermined linear calibration distance from the vehicle which is greater than the actual short calibration distance.

20 Claims, 6 Drawing Sheets

Related U.S. Application Data

(60) Provisional application No. 61/972,043, filed on Mar. 28, 2014.

(51) Int. Cl.

| | | |
|---|---|---|
| *G01S 7/497* | (2006.01) | |
| *G01S 7/40* | (2006.01) | |
| *G01S 13/931* | (2020.01) | |
| *G01S 17/931* | (2020.01) | |
| *G01C 3/02* | (2006.01) | |
| *G05D 1/00* | (2006.01) | |

(56) References Cited

U.S. PATENT DOCUMENTS

| | | | | |
|---|---|---|---|---|
| 6,933,883 | B2 * | 8/2005 | Isaji | G01S 13/931 342/174 |
| 7,162,200 | B2 * | 1/2007 | Tsay | H01Q 1/1257 342/149 |
| 7,253,722 | B2 * | 8/2007 | Deasy | G01S 7/4972 340/436 |
| 7,501,980 | B2 * | 3/2009 | Focke | G01S 13/867 342/174 |
| 7,853,374 | B2 * | 12/2010 | Ko | G01S 13/878 701/408 |
| 8,058,880 | B2 * | 11/2011 | Bradley | H04B 17/0085 324/520 |
| 8,244,024 | B2 * | 8/2012 | Dorrance | G01B 11/2755 382/151 |
| 8,630,795 | B2 * | 1/2014 | Breed | G01C 21/3697 701/400 |
| 9,170,101 | B2 * | 10/2015 | Stieff | G01S 13/931 |
| 9,182,477 | B2 * | 11/2015 | Jones | G01B 11/272 |
| 10,458,811 | B2 * | 10/2019 | Voeller | G01S 17/931 |
| 10,627,226 | B2 * | 4/2020 | Leikert | G01B 11/2755 |
| 10,852,158 | B1 * | 12/2020 | Schlangen | G01S 7/4086 |
| 11,009,586 | B2 * | 5/2021 | Zack | G01S 7/40 |
| 11,009,587 | B2 * | 5/2021 | Conrad | G01S 7/4004 |
| 11,029,390 | B2 * | 6/2021 | Fath | G01S 13/931 |
| 11,069,982 | B2 * | 7/2021 | Cobb | H01Q 17/00 |
| 11,092,667 | B2 * | 8/2021 | Harmer | G01S 7/40 |
| 11,125,859 | B2 * | 9/2021 | Okubo | G01S 13/867 |
| 2002/0105456 | A1 * | 8/2002 | Isaji | G01S 13/931 342/165 |
| 2004/0209574 | A1 * | 10/2004 | Tsay | H04B 17/12 455/67.14 |
| 2006/0164295 | A1 * | 7/2006 | Focke | G01S 13/867 342/174 |
| 2007/0008092 | A1 * | 1/2007 | Deasy | G01S 7/4972 340/436 |
| 2008/0147274 | A1 * | 6/2008 | Ko | G01S 13/878 701/41 |
| 2008/0186383 | A1 * | 8/2008 | Dorrance | G06T 7/70 348/148 |
| 2010/0085061 | A1 * | 4/2010 | Bradley | G01R 31/11 324/520 |
| 2012/0209505 | A1 * | 8/2012 | Breed | G01C 21/3697 701/409 |
| 2013/0110314 | A1 * | 5/2013 | Stieff | G01S 13/931 701/1 |
| 2014/0259707 | A1 * | 9/2014 | Jones | G01B 11/272 33/228 |
| 2015/0160121 | A1 * | 6/2015 | Ridder | G01N 21/274 702/85 |
| 2017/0003141 | A1 * | 1/2017 | Voeller | G01S 17/931 |
| 2019/0004147 | A1 * | 1/2019 | Conrad | G01S 7/4026 |
| 2019/0064320 | A1 * | 2/2019 | Zack | G01S 7/40 |
| 2019/0187249 | A1 * | 6/2019 | Harmer | G01B 11/272 |
| 2019/0249986 | A1 * | 8/2019 | Leikert | G01B 11/2755 |
| 2020/0018822 | A1 * | 1/2020 | Fath | G01S 7/4026 |
| 2020/0096607 | A1 * | 3/2020 | Okubo | G01S 7/4026 |
| 2020/0212589 | A1 * | 7/2020 | Cobb | G01S 7/4086 |

OTHER PUBLICATIONS

Written Opinion corresponding to PCT/US2015/022797 dated Jun. 26, 2015.

\* cited by examiner

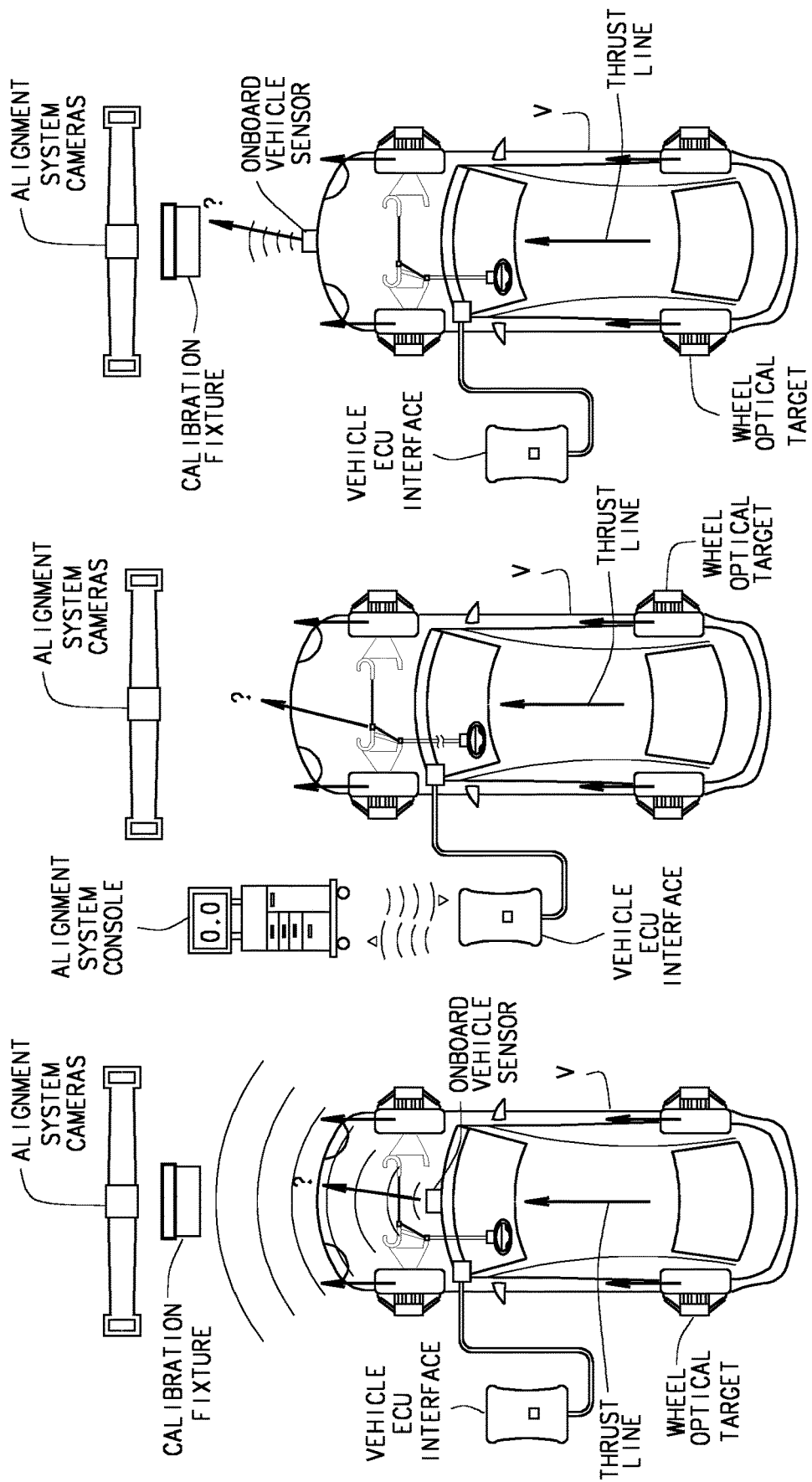

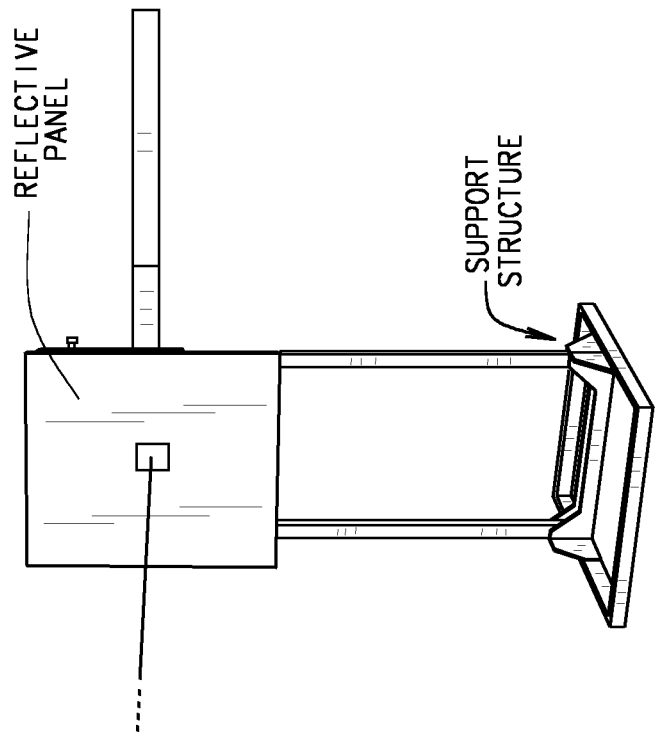
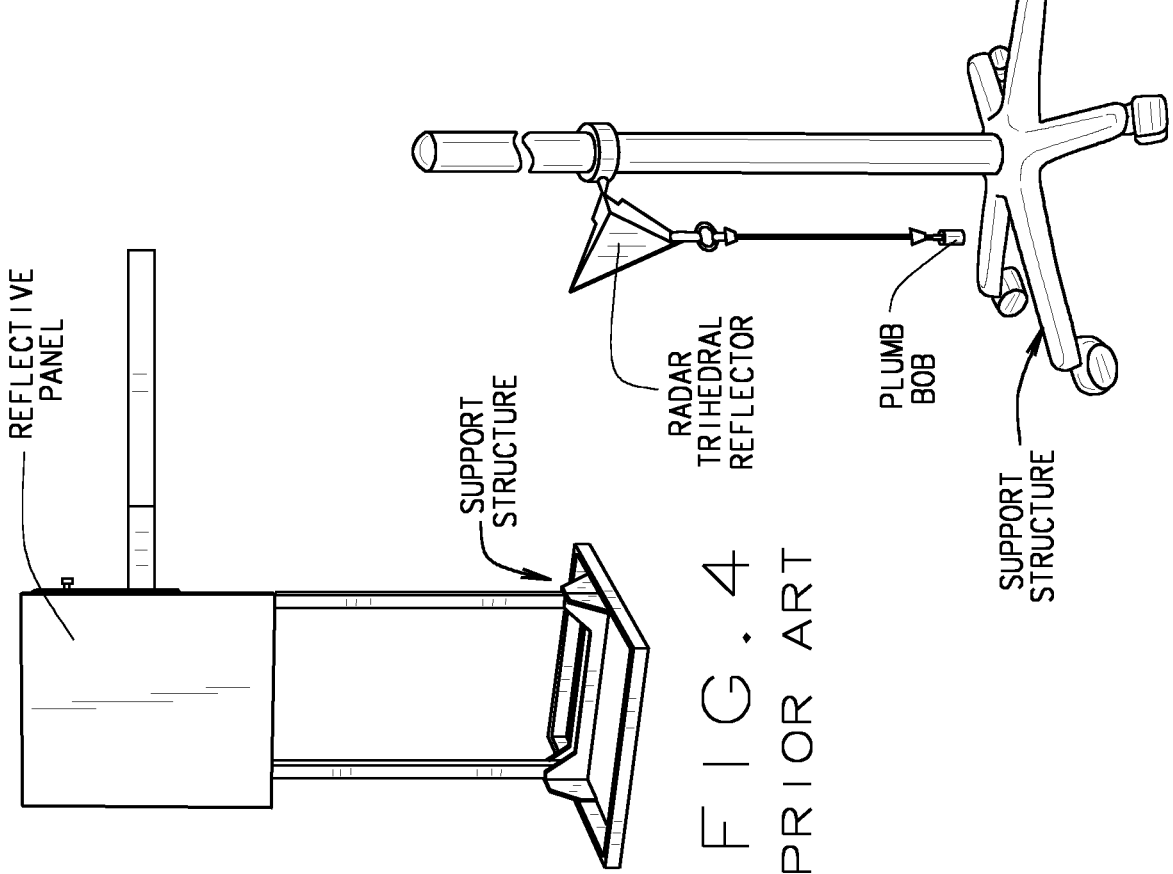
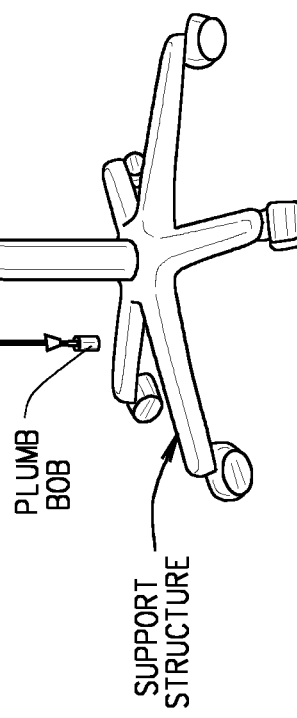
FIG. 6 PRIOR ART
FIG. 5 PRIOR ART
FIG. 4 PRIOR ART

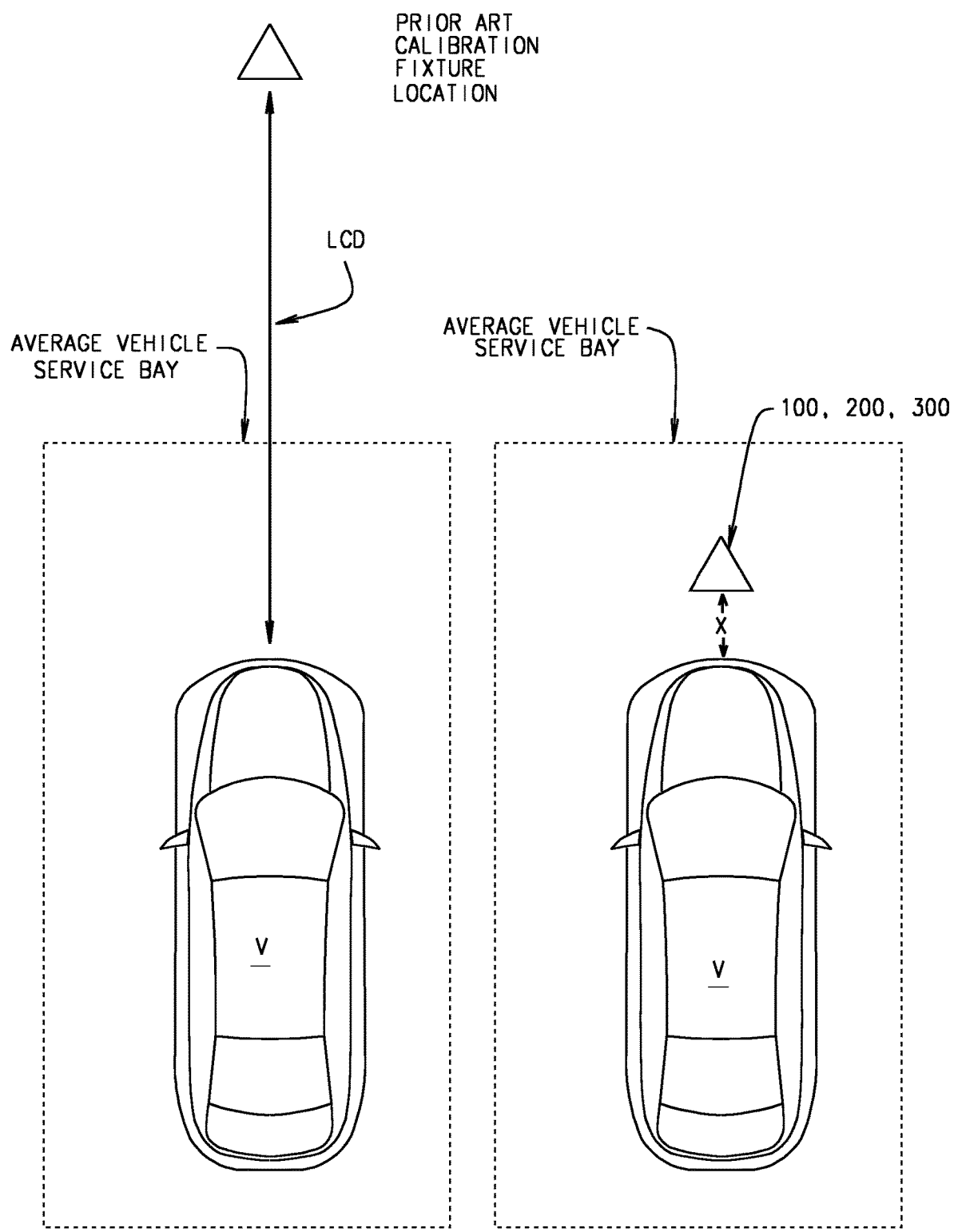

SYSTEM FOR CALIBRATION AND INSPECTION OF RANGE FINDING SENSORS ON A VEHICLE

CROSS-REFERENCE TO RELATED APPLICATIONS

The present application is a continuation of co-pending U.S. patent application Ser. No. 15/125,921 filed on Sep. 13, 2016, which in turn is a U.S. National Stage of PCT/US15/22797 filed Mar. 26, 2015, and which claims the benefit of U.S. Provisional Patent Application Ser. No. 61/972,043 filed on Mar. 28, 2014, each which is herein incorporated by reference.

BACKGROUND OF THE INVENTION

The present application is related generally to vehicle service equipment for use in the alignment, calibration, and inspection of various onboard vehicle sensors for monitoring external surroundings, and more specifically, to a calibration fixture for use in the alignment, calibration, and inspection of range-finding sensors located onboard a vehicle undergoing a service or inspection.

Within the automotive industry there are an increasing number of vehicle manufacturers producing vehicles equipped with onboard sensors for monitoring the external surroundings of the vehicles. These systems include Lane Departure Warning systems (LDW), Lane Keep Assist systems (LKA), Blind Spot Detection systems (BSD), collision mitigation braking systems (CMBS), Adaptive Cruise Control systems (ACC), peripheral vision camera systems, reverse camera systems (backup alarms), and night vision camera systems. As vehicle sensor systems become more advanced, onboard systems rely on input received from these monitoring sensors to provide driver warnings, automate vehicle functions (such as parallel parking), and implement safety features (such as automatic collision avoidance braking and automatically maintaining vehicle spacing).

With increased reliance on the data obtained from these monitoring sensors, it is critical that the data provide an accurate representation of the operating environment for the vehicle, such as the location of surrounding objects, speed differentials between the vehicle and the surrounding objects, and movement of the vehicle itself relative to the surrounding objects. The procedures for alignment, calibration, and/or inspection of the monitoring sensors vary from vehicle to vehicle and from manufacturer to manufacturer, due to the wide range of different types of monitoring sensors entering the market. As seen in FIGS. 1-3, monitoring and range-finding onboard vehicle sensors often require mechanical alignment relative to the vehicle body or to a measured alignment angle of the vehicle, such as the thrust line. Some sensors require calibration with the use of reflective or retro-reflective targets as seen in FIGS. 1, 3, and 4-6, disposed at predetermined positions in the sensor field of view, and which are a significant distance away from the vehicle. Often, this distance may necessitate placement of the calibration fixture at a location which is outside of a typical vehicle service area as seen in FIG. 10, necessitating special arrangements for conducting the service or inspection of the sensors.

Accordingly, it would be advantageous to provide a target or calibration fixture for use in the alignment, calibration, and inspection of range-finding onboard vehicle sensors which can be used within the close confines of a typical vehicle service area, and with a variety of monitoring sensors and/or vehicles.

BRIEF SUMMARY OF THE INVENTION

Briefly stated, in one embodiment of the present disclosure, a calibration fixture for use in the alignment, calibration, or inspection of a range-finding sensor onboard a vehicle is provided. The calibration fixture consists of a support structure for positioning in the field of view of the vehicle sensor. Components establishing a non-linear signal pathway are carried by the support structure, and include an entry point into which an emitted signal from the range-finding sensor is projected. A retro-reflector is disposed within in the signal pathway, such that a non-linear signal travel distance between the entry point and the retro-reflector is of a sufficient length that when the calibration fixture is positioned at a selected location relative to the vehicle, the total distance traveled by a signal emitted from the range-finding sensor which reaches the retro-reflector through the non-linear signal pathway, and is reflected back to the range-finding sensor along the same non-linear signal pathway, travels a total distance which is sufficient for proper calibration of the range-finding sensor, thereby emulating physical placement of a reflective target at a linear calibration distance from the range-finding sensor.

In a further embodiment of the present disclosure, a calibration fixture for use in the alignment, calibration, or inspection of a range-finding sensor onboard a vehicle is provided. The calibration fixture consists of a support structure for positioning in the field of view of the vehicle sensor. Components establishing a non-linear signal pathway are carried by the support structure, and include an entry point into which an emitted signal from the range-finding sensor is projected and an exit point from which a return signal is returned to the range-finding sensor. The components of the non-linear signal pathway are configured such that a non-linear signal travel distance between the entry point and the exit point is of a sufficient length that when the calibration fixture is positioned at a selected location relative to the vehicle, the total distance traveled by a signal emitted from the range-finding sensor which traverses through the non-linear signal pathway, and is returned to the range-finding sensor, travels a total distance which is sufficient for proper calibration of the range-finding sensor, thereby emulating physical placement of a reflective target at a linear calibration distance from the range-finding sensor.

A method of the present disclosure for aligning, calibrating, or inspecting a range-finding sensor onboard vehicle includes the steps of emitting a signal from the range-finding sensor and returning a response signal to the range-finding sensor. The returned response signal consists of a reflection of the emitted signal which has traversed a non-linear signal pathway, effectively emulating in a compact space, an original equipment manufacturer (OEM) required linear calibration signal travel distance, inspection signal travel distance, or alignment signal travel distance associated with the range-finding sensor onboard the vehicle.

In a further embodiment of the present disclosure, vehicle service system is provided with at least a processing system configured with software instructions to execute at least one vehicle service procedure, and a movable calibration fixture configured to facilitate the alignment, calibration, or inspection of a range-finding onboard vehicle sensor. The processing system is further configured with software instructions to access an accessible data store identifying placement locations for the movable calibration fixture relative to a plurality of vehicle configurations, to retrieve and identified placement location associated with the configuration of a vehicle undergoing said service procedure, and to provide an operator with guidance to position the calibration fixture at the retrieved identified placement location relative to the vehicle.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is an illustration of a procedure to calibrate an unknown viewing axis of a Lane Departure Warning (LDW) onboard vehicle sensor relative to a vehicle thrust line;

FIG. 2 is an illustration of a procedure to calibrate an unknown steering axis of an Active Front Steering (AFS) onboard vehicle sensor relative to a vehicle thrust line;

FIG. 3 is an illustration of a procedure to calibrate an unknown viewing axis of an Automatic Cruise Control (ACC) range-finding onboard vehicle sensor relative to a vehicle thrust line;

FIG. 4 is a perspective view of a prior art movable calibration fixture having a large planar reflective surface utilized to align non-range-finding onboard vehicle sensors relative to a vehicle;

FIG. 5 is a perspective view of a prior art movable calibration fixture having a trihedral radar wave retro-reflective structure utilized to align range-finding onboard vehicle sensors relative to a vehicle;

FIG. 6 is a perspective view of a prior art movable calibration fixture similar to FIG. 4, including a laser-emitter system for facilitating placement of the movable fixture relative to a vehicle;

FIG. 10 is a prior art illustration of a required linear calibration distance from a vehicle for placement of an OEM retro-reflective target used to calibrate a range-finding onboard vehicle sensor; and FIG. 11 is an illustration of the placement, relative to a vehicle, of a calibration fixture of the present disclosure used to calibrate a range-finding onboard vehicle sensor.

Corresponding reference numerals indicate corresponding parts throughout the several figures of the drawings. It is to be understood that the drawings are for illustrating the concepts set forth in the present disclosure and are not to scale.

Figure 7A:
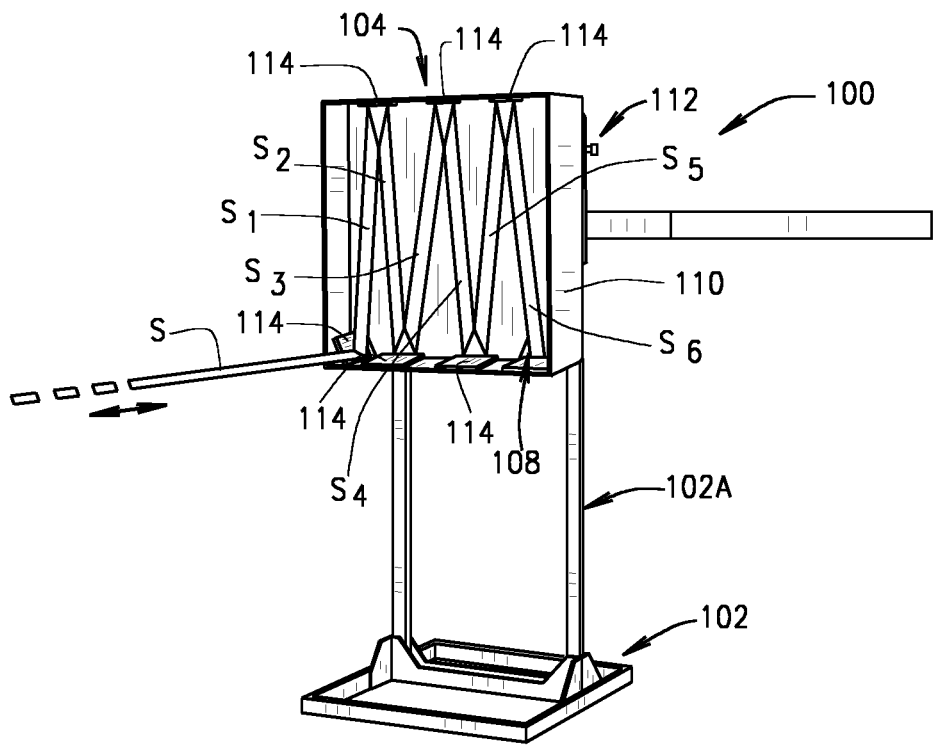
FIG. 7A is an illustration of a calibration fixture of the present disclosure in which a front panel has been removed to reveal a series of reflective elements for establishing a non-linear signal path between a range-finding onboard vehicle sensor and a retro-reflective element.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to FIGS. 7A-B and 8A-B, two embodiments of a movable calibration fixture 100, 200 of the present disclosure incorporating a set of components defining a non-linear signal path for calibration, alignment, or inspection of a range-finding onboard vehicle sensor system are shown. As used herein, the terms "non-linear signal path" and "non-linear signal travel distance" are intended to refer to paths or measures of distance which are not in a straight continuous line, such as those which include at least one directional change or curve between a starting point and an ending point. Each embodiment of the movable calibration fixture 100, 200 consists of a support structure 102, 202 for positioning the fixture within a field of view of a range-finding sensor onboard a vehicle, and the set of components defining a non-linear signal pathway 104, 204, carried by the support structure.

Figure 7B:
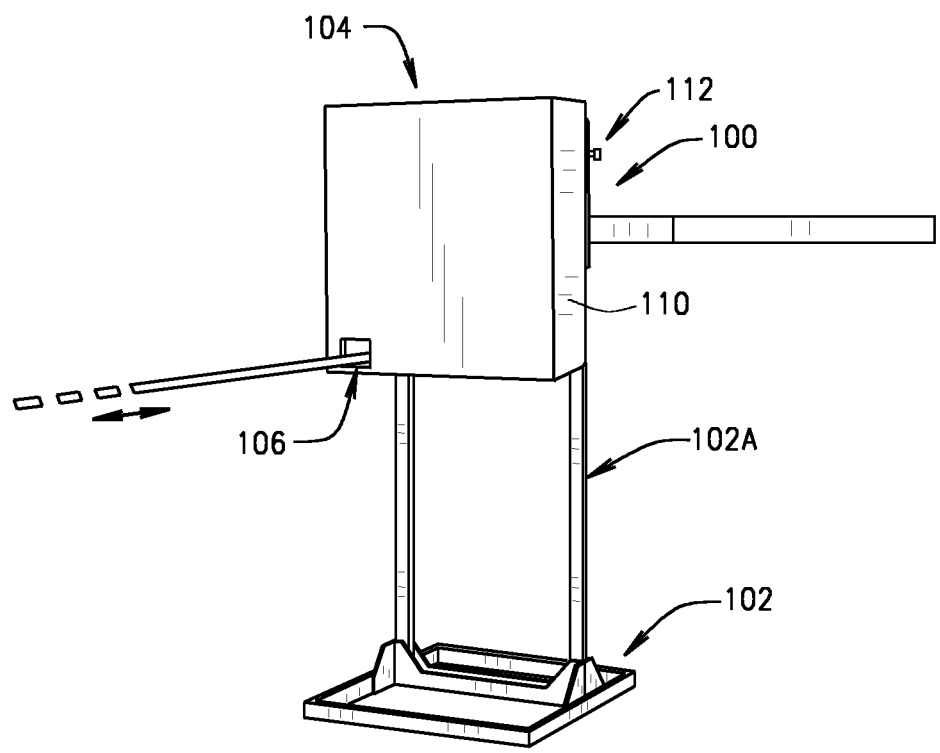
FIG. 7B is an illustration of the calibration fixture of FIG. 7A, with the front panel installed to provide a common entry and exit point associated with the non-linear signal path.

In the embodiment 100, shown in FIGS. 7A and 7B, the non-linear signal pathway includes an entry point 106, such as a window, opening, or designated portion through which a signal can pass, and a reflective element 108 suitable for use with the emitted signal from the range-finding onboard vehicle sensor, such as a reflector or retro-reflector in alignment with the entry point along the non-linear signal pathway. The set of components defining the non-linear signal pathway are contained within a housing or enclosure 110, or may be secured to a suitable substrate. The entry point 106 and the reflective element 108 are spaced apart along the non-linear signal pathway by a non-linear signal travel distance which is related to a linear calibration distance for the range-finding sensor (as shown in FIG. 10), such that the calibration fixture 100 may be operatively positioned in close proximity to the stationary vehicle undergoing service, as seen in FIG. 11, preferably within the confines of a typical vehicle service bay.

Figure 8A:
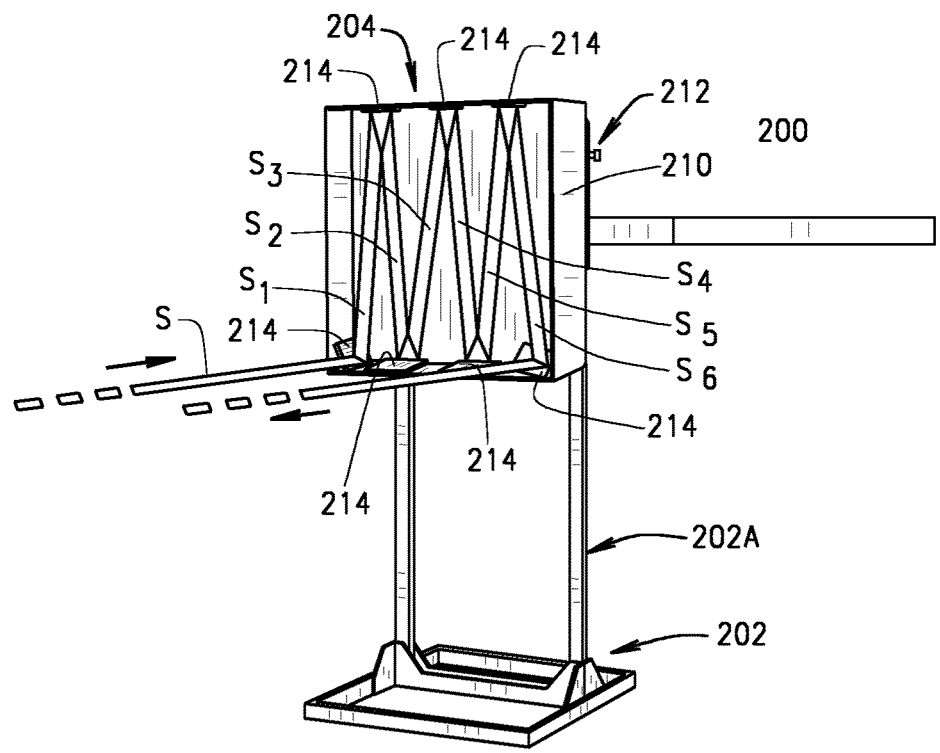
FIG. 8A is an illustration of a calibration fixture similar to FIG. 7A, in which a front panel has been removed to reveal the non-linear signal path which includes both an entry point and an exit point, and lacks a retro-reflective element.
Figure 8B:
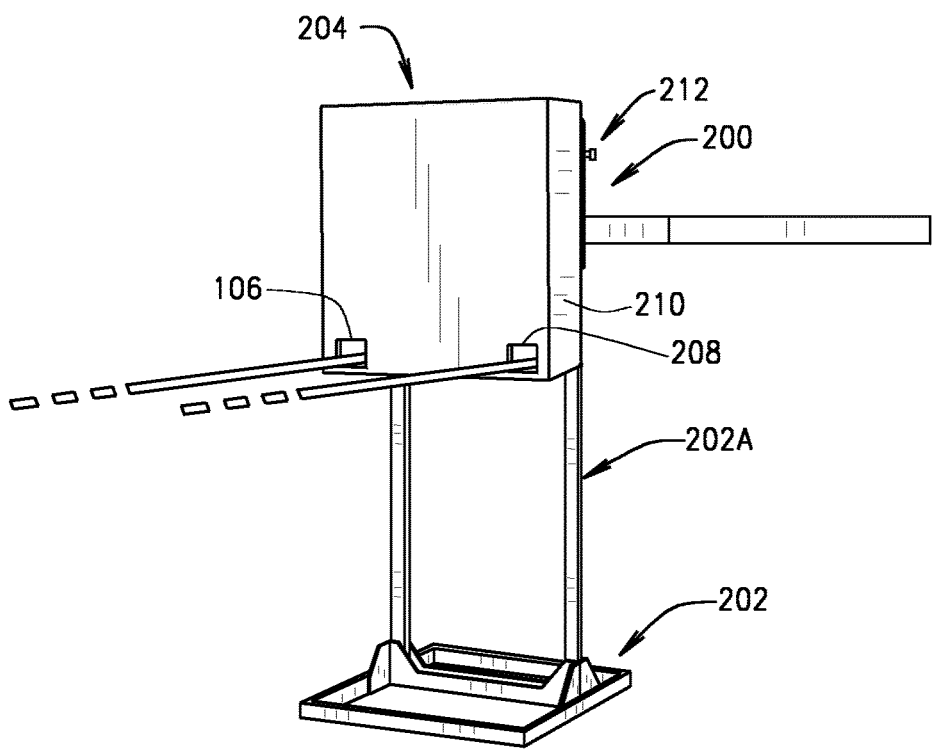
FIG. 8B is an illustration of the calibration fixture of FIG. 8A, with the front panel installed to provide separate entry and exit points associated with the non-linear signal path.

Alternatively, as seen with embodiment 200 shown in FIGS. 8A and 8B, the set of components within the housing or enclosure 210 defining the non-linear signal pathway 204 include both an entry 206 and an exit 208, without a retro-reflective element for receiving signals from, and returning signals to, the range-finding sensor onboard the vehicle. The entry 206 and exit 208 are spaced apart along the signal pathway by a non-linear signal travel distance which is related to a linear calibration distance for said range-finding sensor onboard the vehicle (as shown in FIG. 10), such that the calibration fixture 200 may be operatively positioned in close proximity to the stationary vehicle undergoing service, as seen in FIG. 11, preferably within the confines of a vehicle service bay.

Using the calibration fixture 100, 200, a signal traversing the non-linear signal pathway (together with the distance between the emitter and the entry and/or exit points) is delayed and/or attenuated such that a returned signal or reflected signal has characteristics which are substantially similar to that of a returned signal which travelled directly along a linear calibration distance to a reflector and back to the range-finding sensor, thereby emulating, in a compact space, the requirements of a OEM calibration procedure for a range-finding sensor.

In the embodiments of the calibration fixture 100, 200 shown in FIGS. 7A-B and 8A-B, the calibration fixtures 100, 200 consists generally of a supporting base structure 102, 202 configured to be movable. The supporting base structures 102, 202 may include rollers, casters, or wheels (not shown) as needed to facilitate movement, and one or more leveling feet to adjust the inclination of the calibration fixture 100, 200 when placed in position for use. The supporting base structures 102, 202 each include an appropriate framework 102A, 202A for securing and supporting the components of the non-linear signal path at an appropriate vertical elevation above the ground on which the base structures 102, 202 are positioned. Optionally, the enclosure or substrate 110, 210 containing the components for the non-linear signal path is secured to the framework with adjustable attachments 112, 212, such that the position and orientation of the enclosure or substrate 110, 210 may be adjusted to accommodate the requirements for calibration of range-finding sensors associated with a variety of vehicle configurations.

In order to provide the non-linear signal travel distance which is related to the linear calibration distance required for calibration, alignment, or inspection of a range-finding sensor onboard a vehicle, the set of components of the non-linear signal path contained with the enclosure 110, 210 are disposed to provide a path for an incoming signal passing through the entry 106, 206 to reach the reflector 108 or exit 208. In the embodiments shown in FIGS. 7A-B and 8A-B, these components include a series of individual reflectors or planar surfaces 114, 214 which reflect the incoming signal S, after it enters into the non-linear signal path, through a series of signal path segments Sn before reaching the reflective element 108 or an exit point 208. If a reflective element 108 is present (FIG. 7A), the reflected return signal is routed back through the same signal path segments Sn before exiting the non-linear signal path at the entry point 106, and returning to the range-finding sensor onboard the vehicle. If the reflective element 108 is absent (FIG. 8A) the return signal exits the signal pathway at the exit point 208, and is returned to the range-finding sensor onboard the vehicle. When the returned signal exits the non-linear signal path, the signal S has travelled along the total linear distance defined by the sum of the various lengths of the signal path segments Sn, and has acquired substantially the same characteristics as a signal reflected from a reflective element located at a straight line linear calibration distance from the range-finding sensor onboard the vehicle (such as shown at FIG. 10).

While the non-linear signal path 104, 204 illustrated in FIGS. 7A-B and 8A-B is shown with a generally vertical orientation, such that an entering signal S is reflected through a series of vertically oriented and laterally offset path segments Sn until reaching the reflective element 108 or an exit point 208, those of ordinary skill in the art will recognize that a variety of different configurations are possible without departing from the scope of the invention. In general, it will be recognized that any arrangement of reflectors 114 and orientation of non-interfering signal path segments Sn is permissible to achieve the goal of providing a total non-linear signal path distance which is equivalent to a significant portion of a required straight line linear calibration distance LCD for a range-finding sensor, but which is contained within a compact spatial volume of the calibration fixture 100, 200.

It will be further recognized that the total non-linear signal path distance may not be exactly equal to the required linear calibration distance LCD, so as to permit the calibration fixture to be positioned in proximity to the vehicle undergoing service. However, the combined distance of the total non-linear signal path 104, 204, the distance X between the entry point 106 and the range-finding sensor onboard the vehicle, and the effective distance introduced by any signal attenuation of the non-linear signal path, should correspond to the required straight line linear calibration distance LCD, as shown in FIGS. 10 and 11. For example, if the effective linear distance defined by the non-linear signal pathway 104, 204 in the calibration fixture 100, 200 is equal to 90% of the linear calibration distance LCD required for the range-finding onboard vehicle sensor, and there is no substantial signal attenuation on the signal pathway, positioning the calibration fixture 100, 200 with the entry to the signal path at a position which is 10% of the linear calibration distance LCD from the range-finding onboard vehicle sensor will result in reflected signals which substantially correspond to reflected signals traversing the linear calibration distance LCD in a continuous straight line.

Figure 9:
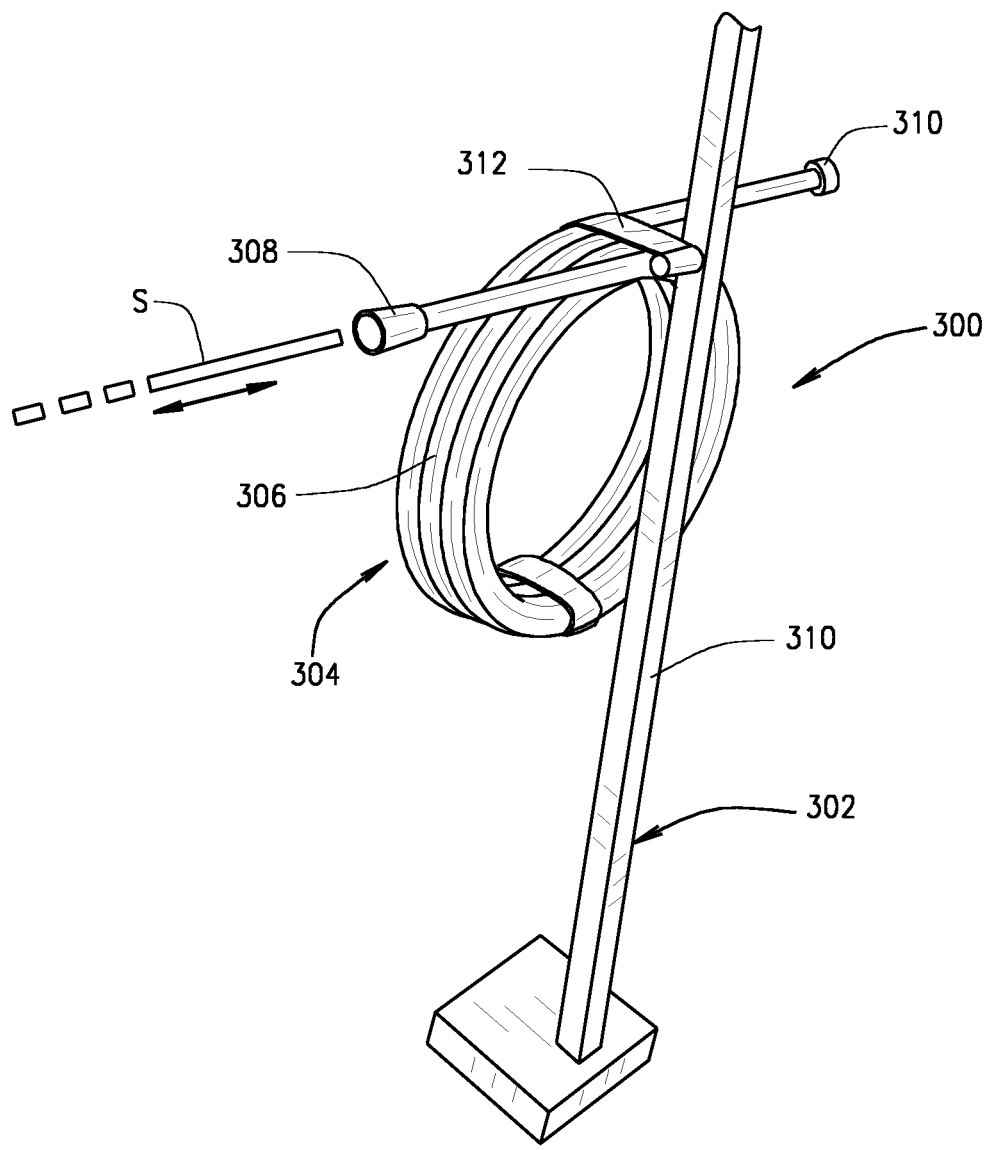
FIG. 9 is an illustration of a calibration fixture of the present disclosure configured with a waveguide for establishing a non-linear signal path between a range-finding onboard vehicle sensor and a retro-reflective element.

In an embodiment of the calibration fixture 300 illustrated in FIG. 9, the non-linear signal path 304 is defined by a waveguide 306 having suitable transmission properties to convey, via internal reflection, a signal S emitted from a range-finding sensor onboard a vehicle and received at an entry point 308 to a reflective element 310 or to an exit point, and to direct the returning signal back to the range-finding sensor. Return signals are conveyed back to the range-finding sensor either by reflection back through the waveguide 306 from the reflective element 310 to the entry point 308, or by exiting the waveguide 306 at an exit point which is aligned towards the range-finding sensor. The waveguide 306 is secured to the framework 310 of the supporting base structure 302 at an appropriate vertical elevation above the ground on which the base structure is positioned 302. The waveguide 306 may optionally be contained within an enclosure (not shown), and is secured to the framework with one or more adjustable attachments 312, such that the vertical position of the waveguide and/or enclosure may be adjusted to accommodate the requirements of different vehicle configurations.

Optionally, the entry point 308 to the waveguide 306 may be configured with a horn or guide adapted to focus, concentrate, or direct incoming signals into the waveguide signal path 304. The waveguide 306 may be coiled, as shown in FIG. 9, looped, wrapped, or bent in any operable configuration which permits the passage of the emitted and returning signals. Those of ordinary skill will recognize that when utilizing a waveguide 306 to provide the signal path, transmission properties of the waveguide material for the particular frequency of incoming signals should be taken into consideration when selecting a length for the waveguide. Radar signals utilized by most range-finding sensors onboard vehicles are typically in the 24-94 Ghz range, but it will be recognized that the teachings of the present disclosure may be adapted without departing from the scope of the invention for other signal frequencies. Signal attenuation during passage through the waveguide 306 may result in signals having the characteristics (i.e., time delay) of signals which have traveled over a signal pathway which is longer than the physical length of the waveguide itself.

During use as seen in FIG. 11, the calibration fixture 100, 200, 300 is positioned in proximity to a vehicle V undergoing service, at a short calibration distance in a field of view of the range-finding sensor onboard the vehicle (not shown). Proper positioning of the calibration fixture may be facilitated by any suitable measurement or guidance system. For example, U.S. Patent Application Publication No. 2013/0110314 A1 to Stieff, herein incorporated by reference, illustrates the use of laser emitters to align a sensor calibration fixture relative to the thrust line of a vehicle undergoing a service procedure. Similarly, U.S. Pat. Nos. 7,382,913 B2 to Dorrance et al. and 8,244,024 B2 to Dorrance et al. each set forth a machine vision system configured to facilitate the placement of a vehicle service apparatus, such as a sensor calibration fixture, relative to a vehicle, by using optical targets and imaging sensors to guide the operator to move the fixture to the proper placement location. Both of the aforementioned patents are incorporated herein by reference.

In one embodiment, the calibration fixture 100, 200 includes an adjustment 112, 212 mechanism carried on the support structure 102, 202 for fine-tuning adjustment of the position of the signal pathway components. The adjustment mechanism may be manually controlled by an operator (such as by a fine-tune knob), or may be automatically controlled by signals from a processing system, such as through the use of a stepper motor. The inclusion and use of an adjustment mechanism 112, 212 enables an operator to roughly position the calibration fixture in the approximate region of a vehicle service area where necessary, then then fine-tune (within the limits of the adjustment mechanism 112, 212) the exact position of the signal pathway components without the need to move or reposition the entire calibration fixture 100, 200. Utilizing feedback from the range-finding sensor onboard the vehicle, an automated adjustment mechanism 112, 212 can be utilized in a close-loop feedback system wherein positioning adjustments are made in response to range-finding signals from the onboard vehicle sensor.

The configuration of the sensor onboard the vehicle V, and in particular of a range-finding sensor can vary significantly between vehicles V of different types and from different manufacturers. These variations necessitate that movable calibration fixtures 100, 200, 300 utilized for the alignment, inspection, and calibration of these range-finding sensors be positioned at different locations for different types of vehicles V undergoing a service or inspection procedure. In one embodiment of the present disclosure, a vehicle service system, consisting of a suitable calibration fixture 100, 200, 300 and at least one processing system, such as may be part of a vehicle wheel alignment measurement system, is configured with software instructions to access a data store identifying calibration procedure placement locations for the movable calibration fixture 100, 200, 300 relative to a plurality of vehicle configurations. The processing system is further configured with software instructions to retrieve an identified placement location associated with the configuration of a vehicle V undergoing a service procedure, and to provide an operator with guidance, via a suitable interface, to position the movable calibration fixture 100, 200, 300 at the identified placement location relative to the vehicle V so that a calibration procedure may be conducted for a range-finding sensor onboard the vehicle.

The data store is preferably a machine-readable medium local to the processing system, such as a flash drive, hard drive, or electronic memory. Alternatively, the data store may be maintained remotely from the processing system, and the processing system provided with a suitable communications interface and protocol configured to access and retrieve information from the data store via an interconnecting communications network, such as the internet. Maintaining the data store remotely from the processing system enables a common data store to be accessed by multiple processing systems, and facilitates distribution of the most current information, such as for new vehicle models, without the need to provide on-site updates to multiple vehicle service systems.

It will be further recognized that the calibration fixture 100, 200, 300 of the present disclosure may be configured as a multi-function device for calibrating, aligning, or inspecting one or more onboard vehicle sensors in addition to the range-finding sensor described previously. For example, one or more optical alignment targets (not shown) may be secured to the support structure of the calibration fixture in place of, or together with, the components of the non-linear signal pathway to facilitate the alignment of a machine vision sensor onboard the vehicle. These optical targets may be passive (i.e., consisting of a set of visible target elements for observation by the machine vision sensor, or reflectors for returning an aligning laser beam) or may be active (i.e., such as infrared LEDs, lasers, or other components configured to emit signals which are visible to the onboard vehicle sensors). By positioning the calibration fixture 100, 200, 300 at suitable locations in the field of view of the particular onboard vehicle sensor to be calibrated, aligned, or inspected, an appropriate procedure complying with the specific requirements of that onboard vehicle sensor may be completed.

For example, some machine vision sensors onboard a vehicle V may require a specifically sized optical calibration target to be placed at a predetermined distance from the vehicle V during a calibration procedure. In order to reduce the actual distance between the machine vision sensor and the optical calibration target, a compact calibration target may be provided on the calibration fixture 100, 200, 300 which corresponds to a reduced-size version of the original optical calibration target, scaled down to appear as the original optical calibration target viewed at the predetermined calibration distance. Preferably, the compact calibration target positioned in close proximity to the vehicle V at a short calibration distance presents the machine vision sensors with the same appearance as an original optical calibration target positioned at the manufacturer-specificed predetermined distance, thereby enabling a calibration procedure to be completed for the machine vision sensors onboard the vehicle within the close confines of a vehicle service bay.

In a further embodiment, the present disclosure sets forth a vehicle service system having at least a processing system configured with software instructions to execute at least one vehicle service procedure, and a movable calibration fixture configured to facilitate the alignment, calibration, or inspection of a range-finding sensor onboard a vehicle. The processing system is further configured with software instructions to access an accessible data store identifying a placement location for said movable calibration fixture relative to at least one vehicle, to retrieve said identified placement location associated with the vehicle undergoing said service procedure; and with software instructions to provide an operator with guidance to position said calibration fixture at said retrieved identified placement location relative to said vehicle. The accessible data store is either a machine-readable medium which is local to said processing system, or it is remote from said processing system and the processing system is further configured with at least one communications interface to retrieve data from said accessible data store via a communications network.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A multi-function calibration fixture for use in the alignment, calibration, or inspection of a plurality of vehicle onboard sensors having external fields of view, including at least one optical sensor unit and at least one radar sensor unit, comprising:
    a support structure for positioning at a first calibration distance from said vehicle within the fields of view of said vehicle onboard sensors;
    a plurality of calibration components disposed on said support structure, said plurality of calibration components each visible to at least one of said plurality of vehicle onboard sensors and configured to appear to said at least one vehicle onboard sensor as if said visible calibration component was positioned at a predetermined linear calibration distance from said vehicle which is greater than said first calibration distance;
    wherein at least one of said plurality of calibration components is an optical calibration component visible to said at least one optical sensor unit; and
    wherein at least one of said plurality of calibration components is a radar target component configured to transform an emitted radar signal from said radar sensor unit into a return signal by conveyance along a non-linear signal pathway from a signal entry to a signal exit, said non-linear signal pathway comprising only passive elements altering a travel direction of said emitted signal such that said return signal appears to said radar sensor unit as if said radar target component is positioned at a predetermined linear calibration distance from said vehicle which is greater than said first calibration distance.

2. The multi-function calibration fixture of claim 1 wherein said radar target component includes a signal retro-reflector in spaced apart alignment with said signal entry, such that said signal entry and said signal exit are at a same location.

3. The multi-function calibration fixture of claim 1 wherein said radar target component includes a plurality of aligned reflective elements for reflecting a radar signal received at said signal entry over a series of path segment defining said non-linear signal travel distance between said signal entry and said signal exit.

4. The multi-function calibration fixture of claim 1 wherein said radar target component includes a waveguide for reflecting a signal received at said signal entry along a non-linear path defining said non-linear signal travel distance between said signal entry and said signal exit.

5. The multi-function calibration fixture of claim 1 wherein said optical calibration component is an optical target including visible features scaled to appear to said at least one optical sensor unit as if viewed at said predetermined linear calibration distance when positioned at said first calibration distance from said vehicle.

6. The multi-function calibration fixture of claim 1 wherein said optical calibration component includes an optical retro-reflector.

7. The multi-function calibration fixture of claim 1 wherein said optical calibration component includes an optical emitter configured to emit an optical signal visible to said at least one optical sensor unit.

8. A vehicle service system for calibrating or inspecting at least one range finding sensor onboard a vehicle undergoing service, comprising:
    a processing system having a user interface and configured with software instructions to receive data identifying said vehicle undergoing service, and to conduct a vehicle service procedure;
    a movable calibration fixture configured with at least one calibration component observable by said at least one range finding sensor;
    wherein said processing system is further configured with software instructions to retrieve from an accessible data store, a placement location relative to identified vehicle for said movable calibration fixture required for calibration or inspection of said at least one range finding sensor; and
    wherein said processing system is further configured with software instructions to utilize said user interface to provide an operator with guidance for positioning said movable calibration fixture at said retrieved placement location.

9. The vehicle service system of claim 8, wherein said movable calibration fixture includes a support structure; and
    at least one calibration component disposed on said support structure, said calibration component visible to said at least one range finding sensor onboard said vehicle and configured to appear to said at least one range finding sensor as if said visible calibration component was positioned at a predetermined linear calibration distance from said vehicle which is greater than an actual distance from said vehicle when said movable calibration fixture is disposed at said retrieved placement location.

10. The vehicle service system of claim 9 wherein said at least one calibration component is an optical calibration component having visible features scaled to appear to said an optical sensor unit as if viewed at said predetermined linear calibration distance.

11. The vehicle service system of claim 9 wherein said at least one calibration component is a radar target component configured to transform an emitted radar signal from a radar sensor unit into a return signal by conveyance along a non-linear signal pathway from a signal entry to a signal exit, said non-linear signal pathway comprising only passive elements altering a travel direction of said emitted signal such that said return signal appears to said radar sensor unit as if said at least one calibration component is positioned at said predetermined linear calibration distance from said vehicle.

12. The vehicle service system of claim 8 wherein said processing system includes a communications interface operatively connected to a communications network; and wherein said data store is accessible via said communications network.

13. The vehicle service system of claim 8, wherein said movable calibration fixture includes:
 a support structure;
 a plurality of calibration components disposed on said support structure, said plurality of calibration components each visible to at least one of a plurality of range-finding sensors onboard said vehicle, each of said calibration components configured to appear to said at least one range-finding sensor as if said visible calibration component was positioned at a predetermined linear calibration distance from said vehicle which is greater than an actual distance from said vehicle when said movable calibration fixture is disposed at said retrieved placement location;
 wherein at least one of said plurality of calibration components is an optical calibration component visible to an optical range-finding sensor, said optical calibration component having scaled visible features; and
 wherein at least one of said plurality of calibration components is a radar target component configured to transform an emitted radar signal from a radar range-finding sensor into a return signal by conveyance along a non-linear signal pathway from a signal entry to a signal exit, said non-linear signal pathway comprising only passive elements altering a travel direction of said emitted signal.

14. A method for aligning, calibrating, or inspecting a sensor onboard a vehicle having an external field of view, comprising:
 positioning a calibration fixture support structure at a short calibration distance from said vehicle, within the external field of view of said sensor;
 presenting at least one calibration component disposed on said support structure towards said sensor onboard said vehicle, said at least one calibration component configured to appear to said sensor as if said at least one calibration component was positioned at a predetermined linear calibration distance from said vehicle which is greater than said short calibration distance; and
 completing at least one of an alignment, calibration, and inspection procedure associated with said sensor onboard said vehicle using said at least one calibration component positioned at said short calibration distance from said vehicle.

15. A method of claim 14 wherein said sensor is a signal-emitting range finding sensor;
 wherein positioning said calibration fixture further includes aligning an entry point to a non-linear signal pathway of the at least one calibration component with a signal-emission field of view for said range-finding sensor; and
 wherein completing said procedure includes
  a. emitting a signal from said range-finding sensor towards said entry point to said non-linear signal pathway such that said emitted signal traverses said non-linear signal pathway;
  b. receiving at said range-finding sensor, a response signal from an exit point of said non-linear signal pathway, said response signal related to said emitted signal; and
  c. processing said received response signal to identify at least one signal characteristic required for aligning, calibrating, or inspecting said range-finding sensor.

16. The method of claim 15 wherein said emitted signal traverses said non-linear signal pathway from said entry point to a retro-reflective element; and
 wherein said response signal is a reflection of said emitted signal from said retro-reflective element, said response signal traversing said non-linear signal pathway from said retro-reflective element to an exit point corresponding to said entry point before being received at said range-finding sensor.

17. The method of claim 16 wherein said step of positioning said calibration fixture locates said retro-reflective element at a direct distance from said range-finding sensor which is less than a required calibration distance for said range-finding sensor.

18. The method of claim 15 wherein said emitted signal traverses said non-linear signal pathway from said entry point to an exit point; and
 wherein said response signal is a return of said emitted signal from said exit point of said signal pathway, said response signal traversing said non-linear signal pathway from said entry point to said exit point before being received at said range-finding sensor.

19. The method of claim 15 further including the step of attenuating at least one of said emitted and response signals during traversal of said non-linear signal pathway, such that said received response signal has at least one characteristic representative of said emitted signal reflected from a reflector disposed at a calibration distance from said range-finding sensor.

20. The method of claim 15 wherein said at least one signal characteristic is a time delay between said emission of said signal from said range-finding sensor and said receipt of said response signal at said range-finding sensor.

* * * * *